(12) United States Patent
Murata

(10) Patent No.: US 12,459,350 B2
(45) Date of Patent: Nov. 4, 2025

(54) AIR INTAKE DUCT

(71) Applicant: Nissan Motor Co., Ltd., Yokohama (JP)

(72) Inventor: Michitomo Murata, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 422 days.

(21) Appl. No.: 17/999,940

(22) PCT Filed: May 29, 2020

(86) PCT No.: PCT/JP2020/021409
§ 371 (c)(1),
(2) Date: Nov. 28, 2022

(87) PCT Pub. No.: WO2021/240806
PCT Pub. Date: Dec. 2, 2021

(65) Prior Publication Data
US 2023/0264564 A1    Aug. 24, 2023

(51) Int. Cl.
*B60K 11/06* (2006.01)
*B60K 1/04* (2019.01)
*B60K 11/08* (2006.01)
*B60R 16/08* (2006.01)

(52) U.S. Cl.
CPC .............. *B60K 11/06* (2013.01); *B60K 11/08* (2013.01); *B60K 1/04* (2013.01); *B60K 2001/0438* (2013.01); *B60R 16/08* (2013.01)

(58) Field of Classification Search
CPC .......... B60K 11/06; B60K 11/08; B60K 1/04; B60K 2001/0438; B60R 16/08; F24F 7/10; F24F 13/068; F24F 13/082; F24F 13/08; B60H 1/246; B60H 2001/00221; B60H 1/34; H01M 10/625
See application file for complete search history.

(56) References Cited

U.S. PATENT DOCUMENTS

2016/0243919 A1*  8/2016  Yamanaka .......... H01M 10/613

FOREIGN PATENT DOCUMENTS

| JP | 2006-224798 A | | 8/2006 | |
|---|---|---|---|---|
| JP | 2006-347318 A | | 12/2006 | |
| JP | 2012-179979 A | | 9/2012 | |
| JP | 2014129039 A | * | 7/2014 | |
| JP | 2016-153279 A | | 8/2016 | |
| KR | 20150094148 A | * | 8/2015 | ............... B60N 3/04 |

OTHER PUBLICATIONS

English translation of JP-2014129039-A, dated Mar. 18, 2025 (Year: 2025).*
English translation of KR-20150094148-A, dated Sep. 11, 2025 (Year: 2025).*

* cited by examiner

*Primary Examiner* — Edelmira Bosques
*Assistant Examiner* — Brett Peterson Mallon
(74) *Attorney, Agent, or Firm* — GLOBAL IP COUNSELORS, LLP

(57) ABSTRACT

An air intake duct is configured to suitably supply air inside a passenger compartment of a vehicle as a cooling air to a battery unit mounted below a floor carpet in the vehicle. The air intake duct includes an intake grille and a protrusion. The intake grille has a plurality of intake holes. The intake grille is disposed in a horizontal direction at substantially a same height as the floor carpet. The protrusion protrudes from the intake grille toward the passenger compartment.

5 Claims, 4 Drawing Sheets

AIR INTAKE DUCT

CROSS-REFERENCE TO RELATED APPLICATIONS

This application is a U.S. national stage application of International Application No. PCT/JP2020/021409, filed on May 29, 2020.

BACKGROUND

Technical Field

The present invention relates to an air intake duct.

Background Information

In recent years, electric vehicles and hybrid vehicles have been actively developed. A battery unit that is an energy source for driving an electric motor is mounted in an electric vehicle.

Because the battery unit generates heat during charging and discharging, it is necessary to implement cooling for maintaining battery performance.

In the prior art, air in a passenger compartment is taken in through intake holes using a cooling fan, the intake holes being provided at positions adjacent to a battery unit, and the air is supplied to the battery unit as a cooling airflow, thus cooling the battery unit (for example, see Japanese Laid-Open Patent Application No. 2012-179979, which is refer to as Patent Document 1 below).

SUMMARY

However, in the intake duct disclosed in Patent Document 1, when the intake holes are obstructed by an obstruction such as paper or a magazine, it is impossible to supply a sufficient cooling airflow to the battery unit, the battery unit increases in temperature, and there is a possibility that battery characteristics will decline, service life will decrease, and other problems will occur.

The present invention was contrived in order to solve the aforementioned problem, it being an object of the invention to provide an intake duct with which it is possible to suitably supply a cooling airflow to a battery unit even if an obstruction is disposed on intake holes.

In order to achieve the above object, the intake duct according to the present invention supplies air inside a passenger compartment as a cooling airflow to a battery unit mounted in a vehicle. The intake duct has an intake grille in which a plurality of intake holes are formed, and a protrusion that protrudes from the intake grille towards the passenger compartment.

BRIEF DESCRIPTION OF THE DRAWINGS

Referring now to the attached drawings which form a part of this original disclosure.

DETAILED DESCRIPTION OF EMBODIMENTS

Figure 1:
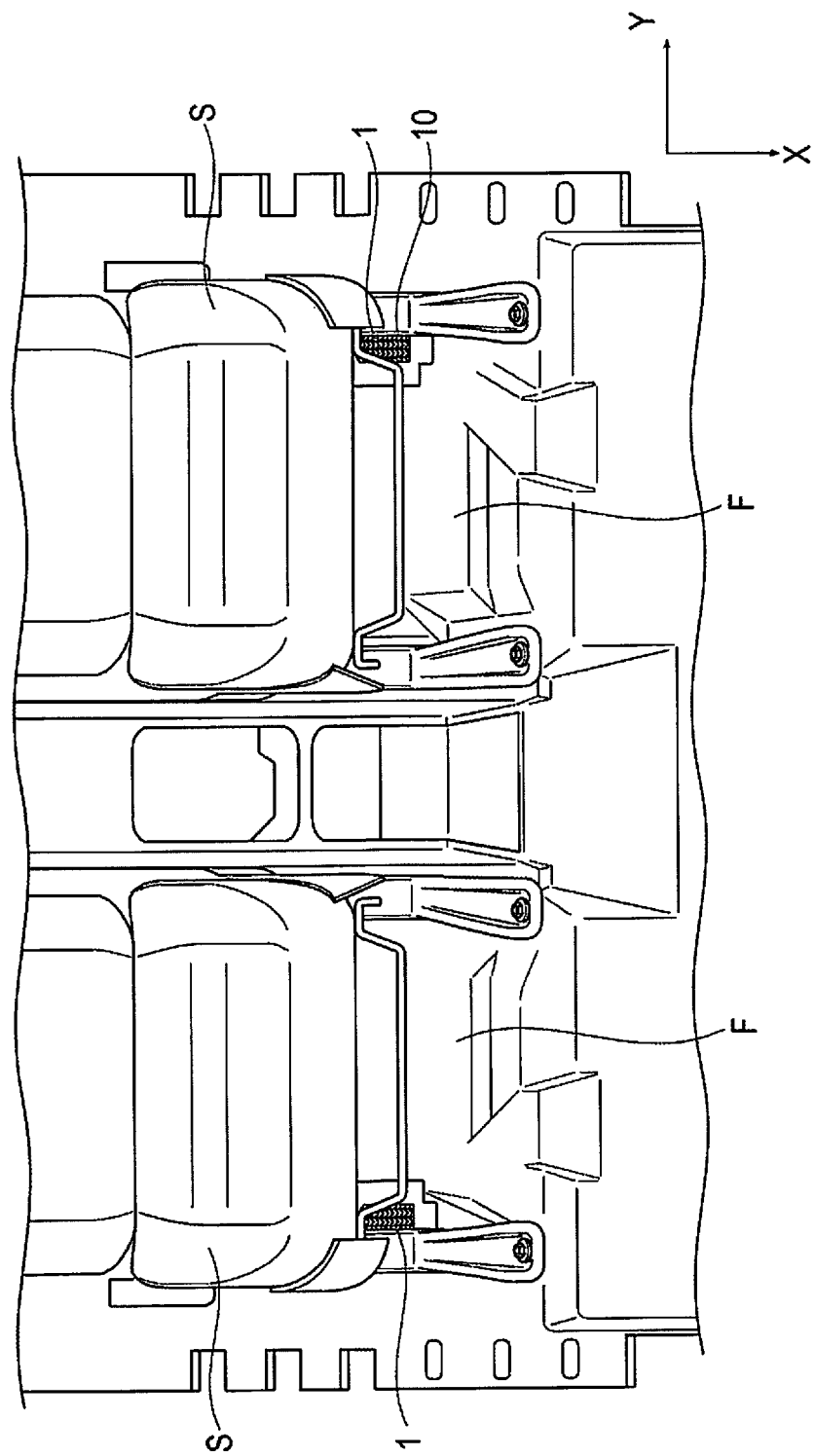
FIG. 1 is a schematic perspective view of a first row of a passenger compartment when seen from a front of a vehicle, specifically a view for illustrating a location where an intake duct according to the present embodiment is disposed.

An embodiment of the present invention is described below with reference to the accompanying drawings. The description given below does not limit the technical scope set forth in the claims or the meaning of terms therein. Additionally, proportions of dimensions in the drawings are exaggerated for convenience of description and can differ from actual proportions in the invention.

Figure 2:
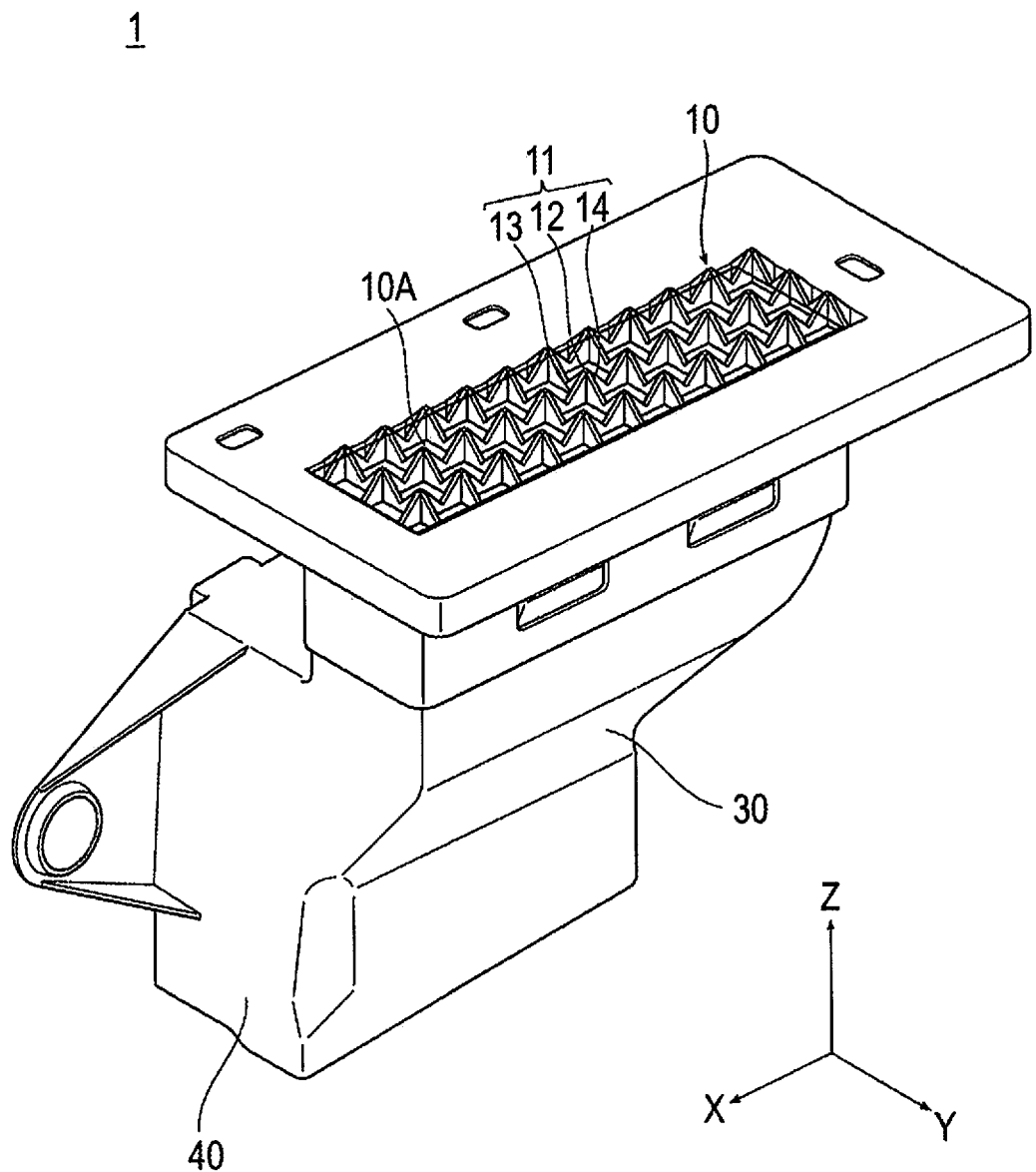
FIG. 2 is a schematic perspective view of the intake duct according to the present embodiment.
Figure 3:
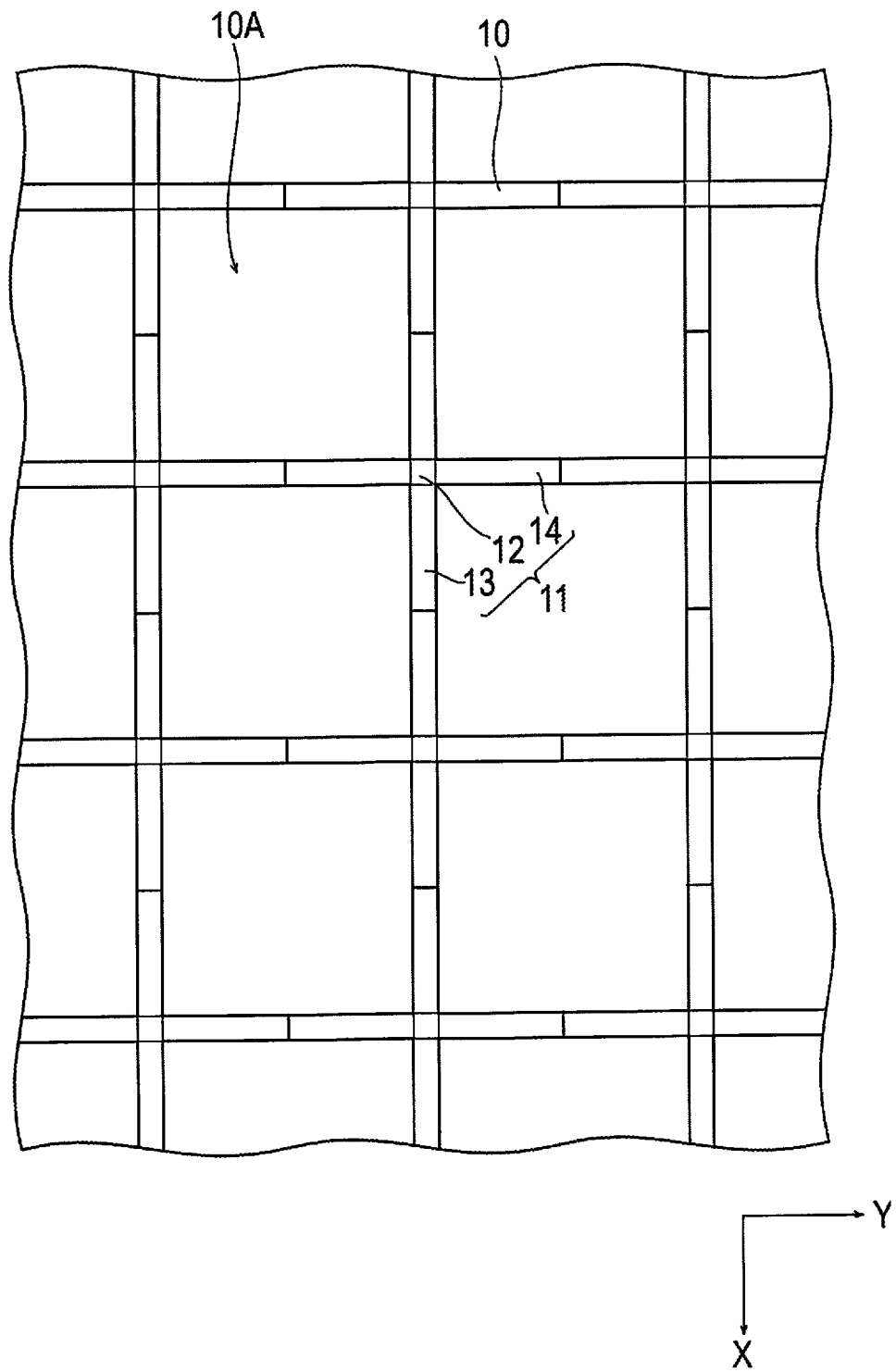
FIG. 3 is a top view of the intake duct according to the present embodiment.
Figure 4:
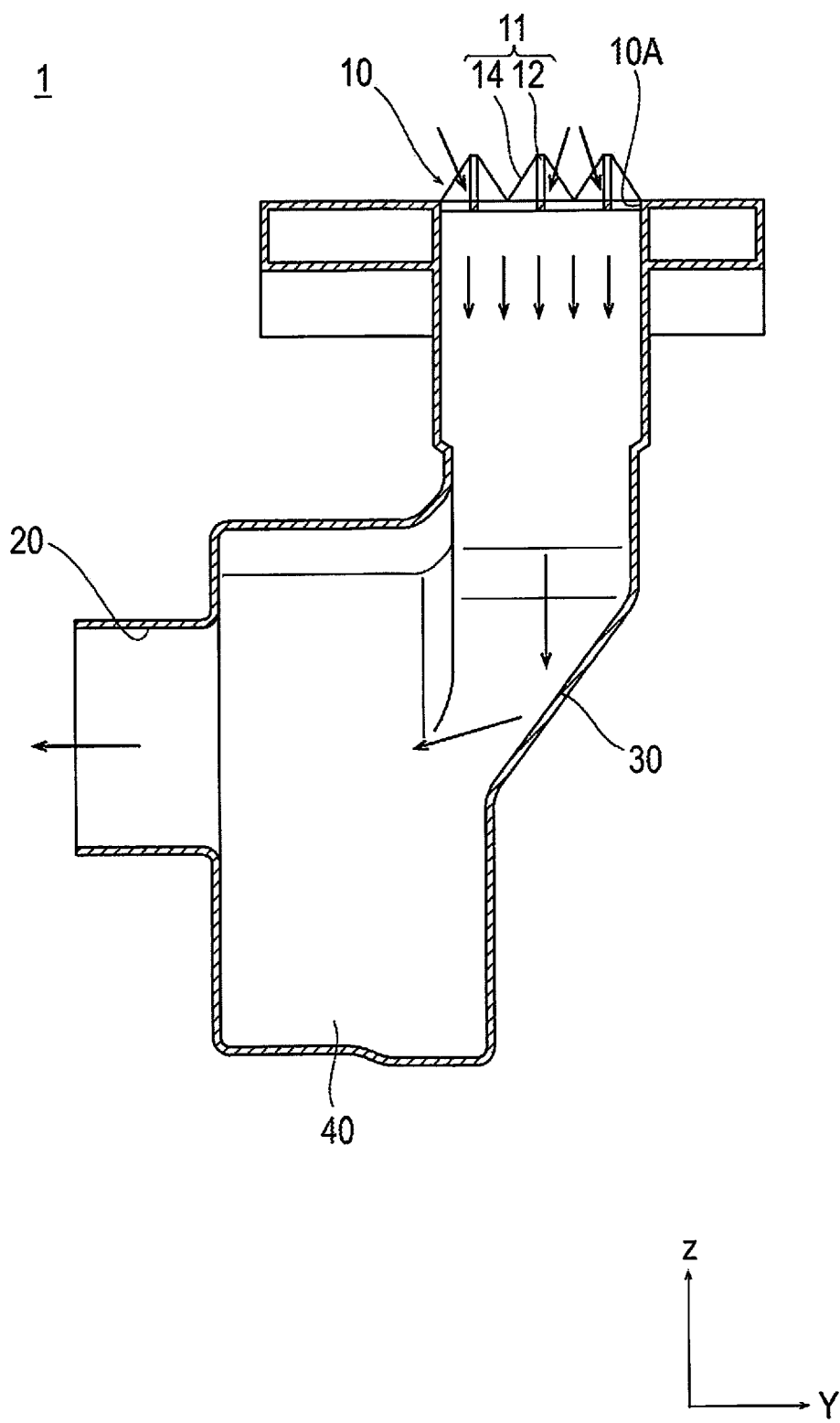
FIG. 4 is a front cross-sectional view of the intake duct according to the present embodiment.

An intake duct 1 according to the present embodiment is described below with reference to FIGS. 1 to 4. FIG. 1 is a schematic perspective view of a first row of a passenger compartment when seen from a front of a vehicle, specifically a view for illustrating a location where the intake duct 1 according to the present embodiment is disposed. FIG. 2 is a schematic perspective view of the intake duct 1 according to the present embodiment. FIG. 3 is a top view of the intake duct 1 according to the present embodiment. FIG. 4 is a front cross-sectional view of the intake duct 1 according to the present embodiment. In the description given below, an X direction indicates a longitudinal direction of the vehicle, a Y direction indicates a width direction of the vehicle, and a Z direction indicates a height direction of the vehicle.

The vehicle V in which the intake duct 1 according to the present embodiment is mounted is an electric vehicle or hybrid vehicle. The intake duct 1 supplies air inside a passenger compartment as a cooling airflow to a battery unit mounted in the vehicle. The battery unit, although not shown, is provided at, e.g., a location below a first row of seats S or below a floor carpet F.

As shown in FIG. 1, a pair of intake ducts 1 according to the present embodiment are provided along the Y direction at a location below the first row of seats S. An intake grille 10 of each of the intake ducts 1 is disposed at substantially the same height as the floor carpet F, as shown in FIG. 1.

The pair of intake ducts 1 are configured so as to have lateral symmetry in the Y direction as seen from the front of the vehicle. A description is given below of the configuration of the intake duct 1 on the right side as seen from the front of the vehicle (i.e., the left side as seen from the driver's seat), among the pair of intake ducts 1.

As shown in FIGS. 2 to 4, the intake duct 1 has: the intake grille 10, in which a plurality of intake holes 10A are formed; a hole section 20 that faces the battery unit and communicates therewith; an inclined wall section 30 provided between the intake grille 10 and the hole section 20; and a reservoir 40 that retains water.

The plurality of intake holes 10A are formed in the intake grille 10, as shown in FIGS. 2 and 3. The intake grille 10 is disposed in a horizontal direction (XY plane), as shown in FIG. 1. Specifically, when air inside the passenger compartment passes through the intake holes 10A, the air moves along a substantially vertical direction.

As shown in FIG. 3, the intake holes 10A formed in the intake grille 10 are configured in a substantially rectangular shape as seen from above. Because the intake grille 10 is configured in this manner, it is possible to suitably ensure the area of the intake holes 10A and prevent any decrease in pressure loss during intake.

Protrusions 11 that protrude toward the passenger compartment (upward in the vertical direction) are formed on the intake grille 10.

As shown in FIGS. 2 to 4, each of the protrusions 11 has a vertical wall section 12 that rises toward the passenger compartment (in the Z direction), a first inclined section 13 that is continuous with the vertical wall section 12 and that is provided at an incline such that a height of the first inclined section 13 decreases in the longitudinal direction (X direction) of the vehicle, and a second inclined section 14 that is continuous with the vertical wall section 12 and that is provided at an incline such that a height of the second inclined section 14 decreases in the width direction (Y direction).

The first inclined section 13 and the second inclined section 14 are configured integrally with the vertical wall section 12. The first inclined section 13 and the second inclined section 14 may be configured separately from the vertical wall section 12.

As shown in FIG. 2, the intake grille 10 is configured to have a plurality of peaked profiles in which the vertical wall section 12 and the first inclined section 13 are continuously repeated along the X direction. Additionally, as shown in FIG. 2, the intake grille 10 is configured to have a plurality of peaked profiles in which the vertical wall section 12 and the second inclined section 14 are continuously repeated along the Y direction.

In the protrusions 11 configured as described above, air that is taken in toward the intake grille 10 from a direction inclined from the Z direction collides with the first inclined section 13 and second inclined section 14 and is redirected in the Z direction (refer to arrows in FIG. 4). Therefore, it is possible to suppress intake noise or to suppress intake resistance.

The hole section 20 is provided near a lower-left location of the intake duct 1 as seen in cross-section from a front surface, as shown in FIG. 4. Air that is taken in from the intake grille 10 is supplied to the battery unit via the hole section 20, thus cooling the battery unit.

The inclined wall section 30 is formed below the intake grille 10 and rightward of the hole section 20 as seen in cross-section from the front surface, as shown in FIG. 4. The inclined wall section 30 is configured linearly so as to extend along the indicated Z direction while also extending along the indicated Y direction. Therefore, air that is taken in from the intake grille 10 moves toward the hole section 20. Because the inclined wall section 30 is provided in this manner, it is possible for air that is taken in from the intake grille 10 to be suitably supplied to the battery unit.

The reservoir 40 is provided below the hole section 20 and the inclined wall section 30 as seen in cross-section from the front surface, as shown in FIG. 4. The reservoir 40 is recessed, as shown in FIG. 4. The reservoir 40 is provided in order to remove water and contaminants.

For example, when no reservoir 40 is provided, there is a concern that intake noise will be generated because a cross-sectional area of a flow path in the hole section 20 is reduced. However, because the reservoir 40 is provided in the intake duct 1 according to the present embodiment, it is possible to absorb pressure fluctuations in the reservoir 40 and suppress generation of intake noise.

Effects of the intake duct 1 according to the present embodiment are described next. For example, in the case of an intake duct provided with an intake grille having no protrusions 11, it is impossible to supply a sufficient cooling airflow to a battery unit when an obstruction such as paper or a magazine covers the intake grille. As a result, the battery unit increases in temperature, and there is a possibility that battery characteristics will decline, service life will decrease, and other problems will occur.

However, in the intake duct 1 according to the present embodiment, the protrusions 11, which protrude toward the passenger compartment, are provided to the intake grille 10. Therefore, even if an obstruction is disposed above the intake grille 10, a space is created between the obstruction and the intake holes 10A due to the protrusions 11, and it is possible to ensure an intake path. Accordingly, it is possible to supply a sufficient cooling airflow to the battery unit even if an obstruction is disposed on the intake grille 10, and suitably prevent any increase in the temperature of the battery unit, any decline in battery characteristics, any decrease in service life, and any occurrence of other problems.

As described above, the intake duct 1 according to the present embodiment supplies air inside the passenger compartment as a cooling airflow to the battery unit mounted in the vehicle. The intake duct 1 has: the intake grille 10, in which a plurality of intake holes 10A are formed; and the protrusions 11, which are provided to the intake grille 10 and which protrude toward the passenger compartment. In the intake duct 1 configured in this manner, it is possible to supply a sufficient cooling airflow to the battery unit even if an obstruction is disposed on the intake grille 10, and suitably prevent any increase in the temperature of the battery unit, any decline in battery characteristics, any decrease in service life, and any occurrence of other problems.

The intake grille 10 is disposed along a horizontal direction, and the protrusions 11 are formed along the vertical direction. In the intake duct 1 configured in this manner, although it is easy for obstructions to be disposed above the intake grille 10 due to gravity, it is possible to supply a sufficient cooling airflow to the battery unit even if an obstruction is disposed on the intake grille 10.

Additionally, each of the protrusions 11 has: the vertical wall section 12, which rises toward the passenger compartment; the first inclined section 13, which is continuous with the vertical wall section 12 and which is provided at an incline in the longitudinal direction of the vehicle; and the second inclined section 14, which is continuous with the vertical wall section 12 and which is provided at an incline in a lateral direction of the vehicle. In the intake duct 1 configured in this manner, air that is taken in from a direction inclined from the Z direction collides with the first inclined section 13 and second inclined section 14 and is redirected in the Z direction. Therefore, it is possible to suppress intake noise or to suppress intake resistance.

Additionally, the intake duct 1, as seen in cross-section from the front surface, has: the hole section 20, which faces the battery unit and communicates therewith; and the inclined wall section 30, which is provided at an incline between the intake grille 10 and the hole section 20. In the intake duct 1 configured in this manner, it is possible for air that is taken in from the intake grille 10 to be suitably supplied to the battery unit.

Moreover, the intake duct 1, as seen in cross-section from the front surface, has the reservoir 40, which retains water. In the intake duct 1 configured in this manner, it is possible to absorb pressure fluctuation in the reservoir 40 and suppress generation of intake noise.

The intake duct 1 according to the present embodiment was described above by way of an embodiment, but the present invention is not solely limited to the matter described in the aforementioned embodiment, and can be modified, as appropriate, on the basis of the claims.

For example, in the embodiment described above, the intake grille 10 is disposed along the horizontal direction, and the protrusions are formed along the vertical direction. However, the intake grille 10 may also be provided at an incline from the vertical direction or from the horizontal direction.

Also, in the embodiment described above, each of the protrusions 11 has a vertical wall section 12, a first inclined section 13, and a second inclined section 14. However, the shape of the protrusions is not limited, provided that it is possible to create a space between an obstruction and the intake holes 10A and ensure an intake path.

Additionally, in the embodiment described above, the intake duct 1, as seen in cross-section from the front surface, has the inclined wall section 30 and the reservoir 40. However, the intake duct need not have these sections.

The invention claimed is:

1. An air intake duct that supplies air inside a passenger compartment of a vehicle as a cooling air to a battery unit mounted below a floor carpet in the vehicle, the air intake duct comprising:
    an intake grille having a plurality of intake holes, and the intake grille being disposed in a horizontal direction at substantially a same height as the floor carpet; and
    a protrusion protruding from the intake grille toward the passenger compartment, the plurality of intake holes being formed so as to open as viewed in a vertical direction of the vehicle,
    the plurality of intake holes and the protrusion being arranged so as to communicate in the vertical direction relative to the floor carpet, and
    the protrusion partially defining at least one of the plurality of intake holes in the intake grille.

2. The air intake duct according to claim 1, wherein
the intake grille is disposed along the horizontal direction, and
the protrusion is formed along a vertical direction.

3. The air intake duct according claim 2, wherein
the air intake duct includes a reservoir that stores water.

4. The air intake duct according to claim 1, wherein
the protrusion includes
a vertical wall section that rises toward the passenger compartment,
a first inclined section that is continuous with the vertical wall section and that is inclined in a longitudinal direction of the vehicle, and
a second inclined section that is continuous with the vertical wall section and that is inclined in a width direction of the vehicle.

5. The air intake duct according to claim 1, wherein
the intake duct includes
a hole section that communicates with the battery unit as seen in cross-section from a front surface, and
an inclined wall section that is inclined between the intake grille and the hole section.

* * * * *